United States Patent [19]

Minai et al.

[11] 3,899,435

[45] Aug. 12, 1975

[54] FERROELECTRIC CERAMIC COMPOSITIONS

[75] Inventors: Kiichi Minai, Kyoto; Isamu Inada; Kenji Ozawa, both of Osaka; Kenji Okochi, Youkaichi, all of Japan

[73] Assignee: Murata Manufacturing Co., Ltd., Japan

[22] Filed: Jan. 12, 1973

[21] Appl. No.: 323,297

Related U.S. Application Data

[63] Continuation-in-part of Ser. No. 207,853, Dec. 14, 1971, abandoned.

[52] U.S. Cl. .............................................. 252/62.9
[51] Int. Cl. ...................... C04b 35/46; C04b 35/48
[58] Field of Search .................................. 252/62.9

[56] References Cited
UNITED STATES PATENTS

| | | | |
|---|---|---|---|
| 3,594,321 | 7/1971 | Ohno et al. | 252/62.9 |
| 3,637,506 | 1/1972 | Tanizake et al. | 252/62.9 |
| 3,640,866 | 2/1972 | Nishida et al. | 252/62.9 |

OTHER PUBLICATIONS
Tanaka et al., "Chem. Abstracts," Vol. 64, 1966.

*Primary Examiner*—Jack Cooper
*Attorney, Agent, or Firm*—Stewart and Kolasch, Ltd.

[57] ABSTRACT

Ferroelectric ceramic compositions comprising the ternary system ceramic composition which is represented by the general formula: $x\text{Pb}(\text{Nb}_\alpha \text{Cr}_{2-3\alpha} \text{Mn}_{2\alpha-1})\text{O}_3\text{-}y\text{PbTiO}_3\text{-}z\text{PbZrO}_3$ wherein $x$, $y$ and $z$ are the respective molecular ratios, $x + y + z = 1.00$ and $0.525 < \alpha < 0.625$, said compositions falling within the polygon encompassed by the points A, B, C, D, E, F and G in the attached FIG. 1. These ferroelectric ceramic compositions have excellent characteristics such as the mechanical quality factor, the electromechanical coupling factor and the relative dielectric constant, and are useful, especially, as materials for ceramic filters, ultrasonic waves and/or piezoelectric transformers, and the characteristics thereof are stable and constant with repeated high temperature and low temperature heat cycles.

2 Claims, 8 Drawing Figures

Thickness trap mode

Intermediate Frequency

FERROELECTRIC CERAMIC COMPOSITIONS

This is a continuation-in-part application of Ser. No. 207,853, filed Dec. 14, 1971, now abandoned.

The present invention relates to ferroelectric ceramic compositions. More particularly, the invention relates to ternary system compositions of $Pb(Nb_\alpha Cr_{2-3\alpha} Mn_{2\alpha-1})O_3$-$PbTiO_3$-$PbZrO_3$ which are useful as ferroelectricpiezoelectric ceramics.

It has been known that lead zirconate-titanate ceramics possess excellent piezoelectric characteristics and that othr improved types of ceramics have been reported, for example, those prepared by replacing part of the lead of $Pb(Zr,Ti)O_3$ with a bivalent element such as Ba, Sr, Ca, etc. and those prepared by incorporating in the aforementioned basic components various oxides such as $Cr_2O_3$, $Nb_2O_5$, $Fe_2O_3$, $MnO_2$, etc. These materials have the properties suitable for use in various fields. However, it has been observed in most of the improved materials described above that the maximum level of the mechanical quality factor $(Qm)_2$ which indicates the quality of piezoelectric characteristics thereof, is only about 2,000. And when a piezoelectric ceramic composition is utilized as a ceramic filter, a heat cycle test with a temperature range of $-40°C$ to $+100°C$ is generally used to examine the stability of its characteristics. In such case, it is known that the deterioration of the thickness trap mode vibration is much greater than that of the planar extentional mode vibration. It is also known that if the intermediate frequency (for example, 10.7 MHz) of a thickness trap mode filter varies even slightly (for example, 0.03 MHz), it is not usable as a ceramic filter. However, when the improved materials mentioned above are used as ceramic filters, the characteristics of the ceramic filter deteriorate little by little. In other words, if the ceramic filter is used repeatedly in a heat cycle of a high temperature and a low temperature, its characteristics deteriorate gradually. Moreover, since it is necessary to use high firing temperature of about 1,270 to 1,330°C for these ceramics, the firing process is accompanied by the evaporation of the lead. As a result, the reappearance of the ceramics during the manufacturing process is poor, thereby constituting a serious drawback.

One of the objects of the present invention is to overcome the disadvantages and drawbacks encountered with the prior art ferro- and piezoelectric ceramic materials.

Another object of this invention is to provide novel and useful ferroelectric ceramic compositions exhibiting a large mechanical quality factor.

Another object of this invention is to provide novel ferroelectric ceramic compositions having a large value of both the electro-mechanical coupling factor and the relative dielectric constant.

Another object of this invention is to provide novel ferroelectric ceramic compositions, the characteristics of which are stable and constant with repeated heat cycles.

A still further object of this invention is to provide ferroelectric ceramics suitable for use, for example, as materials for ceramic filters, elements for ultrasonic waves, elements for piezoelectric transformers, etc.

These and other objects and advantages of the present invention will become apparent to those skilled in the art from a consideration of the following specification and claims, taken in conjunction with the accompanying drawings.

The ferroelectric ceramic compositions of this invention have a large value of about 4,000 for the mechanical quality factor $Qm$, far beyond the former limited value of about 2,000, and display a more desirable range of 20 to 60 % for the electro-mechanical coupling factor $Kp$ and a range of 200 to 800 for the relative dielectric constant ($\epsilon_{33}^T/\epsilon_o$). Further, the characteristics of the compositions according to the invention are stable and constant with repeated high temperature and low temperature heat cycles. Thsu, these compositions are particularly useful as materials for ceramic filters, elements for ultrasonic waves, piezoelectric transformers, etc. Moreover, the firing temperature of the inventive ceramics is in a range of 1,200° to 1,240 °C, lower than that of the firing range of 1,270° to 1,330°C used with the prior art compositions, so that the evaporation of the lead is minimal. Consequently, ceramics having an excellent appearance and good properties can be prepared in the manufacturing process. Hence, mass production of the ceramics of the invention can be effected in a far superior manner as compared to the ceramics of the prior art, and the inventive ceramics are useful industrially.

According to the present invention, the ferroelectric ceramic compositions comprise ternary system solid solutions represented by the general formula: $xPb(Nb_\alpha Cr_{2-3\alpha} Mn_{2\alpha-1})O_3$-$yPbTiO_3$-$zPbZrO_3$ wherein $x$, $y$ and $z$ are the molecular ratio of each component, $x+y+z=1.00$ and $0.525<\alpha<0.625$. The compositions of this invention fall within the polygon encompassed by the points A, B, C, D, E, F and G in FIG. 1 the sets of molecular ratios at the vertices of said polygon being as follows:

|   | x | y | z |
|---|------|------|------|
| A | 0.30 | 0.40 | 0.30 |
| B | 0.10 | 0.60 | 0.30 |
| C | 0.01 | 0.60 | 0.39 |
| D | 0.01 | 0.14 | 0.85 |
| E | 0.10 | 0.05 | 0.85 |
| F | 0.20 | 0.10 | 0.70 |
| G | 0.30 | 0.20 | 0.50 |

The invention will now be further explained with reference to certain illustrative embodiments thereof.

Figure 6:
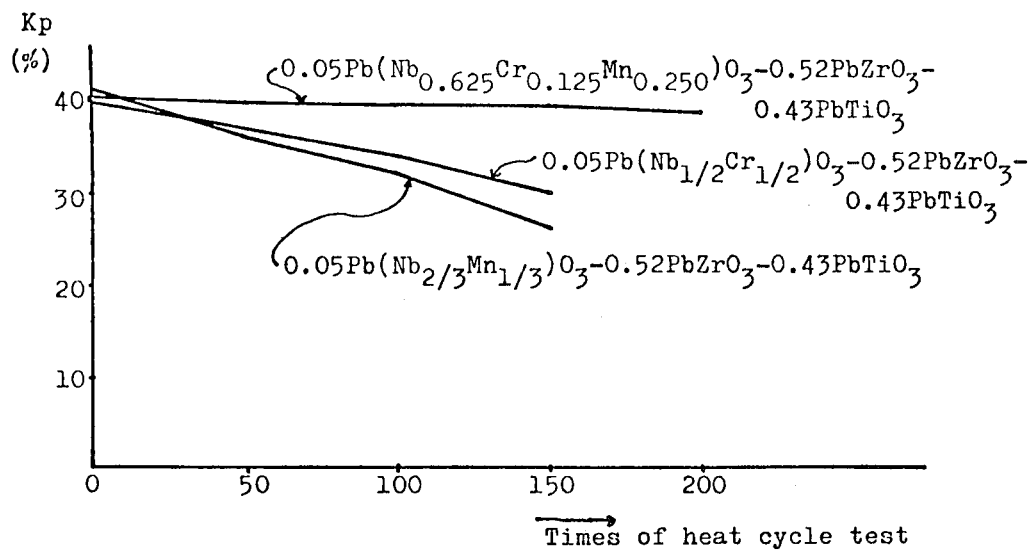
Figure 5:
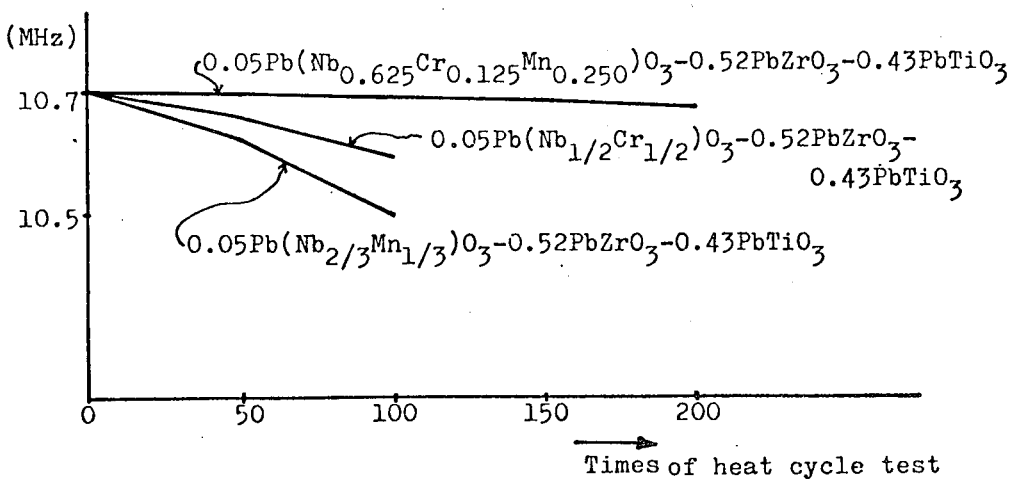
Figure 8:
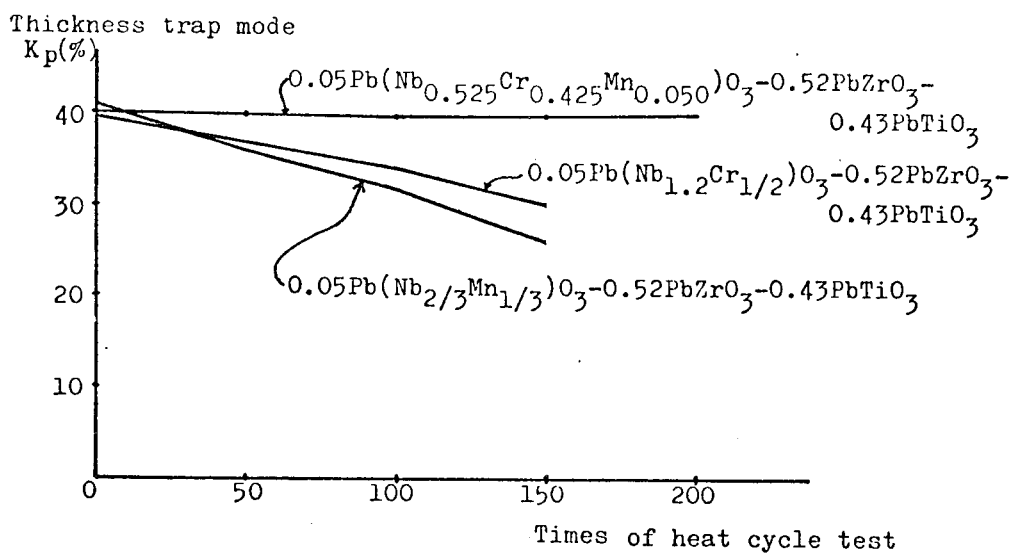
Figure 7:
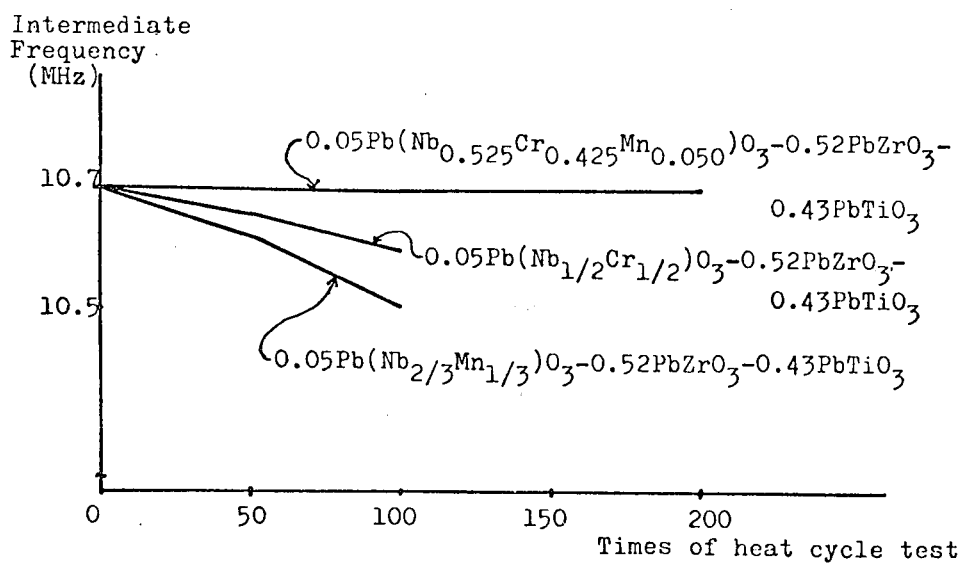

FIG. 5 and FIG. 7 are graphic representations showing the change of electro-mechanical coupling factor ($Kp$) of the ceramic compositions according to the heat cycle test, when $\alpha$ is 0.625 and 0.525, respectively, in said general formula; and FIG. 6 and FIG. 8 are graphic representations showing the respective change of the intermediate frequency (IF=10.7 MHz) owing to the heat cycle test, when $\alpha$ is 0.625 and 0.525, respectively, in said general formula.

The ceramic materials according to the present invention may be prepared, for example, in the following manner.

The compounds PbO(or $Pb_3O_4$), $Nb_2O_5$, $Cr_2O_3$, $MnCO_3$, $TiO_2$ and $ZrO_2$ are used as the starting materials. These materials are weighed so that the specimens will have the compositional proportions shown in Table 1. These materials are then mixed by the wet process in a ball mill using agate balls for about 20 hours in order to obtain a fully uniform or homogeneous composition. After the mixture is dried, it is calcined at a temperature of about 800°C. The clinker is then milled by the wet process with a suitable amount of binder for about 5 to 10 hours. And after the mixture is dried, it is passed through an 80 mesh sieve. The powder obtained is formed into a disk with a diameter of 22 mm and a thickness of 1.2 mm at a pressure of 750 to 1,000 kg/cm² and is sintered at the temperature shown in Table 1. Thereafter, each plane of sintered materials is fitted with a silver electrode by firing and is polarized in an insulating oil by applying a D.C. field of about 2.0 to 4.0 kv/mm at a suitable temperature.

The measurement of piezoelectric characteristics of the ceramics obtained by the above described method was made with an IRE standard circuit and the relative dielectric constant was measured with a capacitance bridge. The results obtained are shown in Table 1 and Table 2.

The stabililty of the characteristics of the obtained ceramics are examined by the heat cycle test with a temperature range of −40°C to 100°C. One cycle of the heat cycle test involves cooling the ceramic to be examined to a temperature of −40°C and maintaining it at that temperature for several minutes, then heating it to a temperature of +100°C and maintaining it at that temperature for several minutes, and finally recooling it. The results obtained are shown in Table 2 and FIGS. 5, 6, 7 and 8. In these figures, the results are shown with the test results of prior compositions. FIGS. 5 and 6 show the results when $\alpha$ is 0.625 in said general formula, and FIGS. 7 and 8 show the results when $\alpha$ is 0.525.

Table 1

| Material number | | Mol ratio of basic composition | | | Mol ratio of x component of composition | | | Firing tem. (°C) | Relative dielectric constant | Electromechanical coupling factor Kp % | Mechanical quality factor Qm |
|---|---|---|---|---|---|---|---|---|---|---|---|
| | | x | y | z | $\alpha$ | $2-3\alpha$ | $2\alpha-1$ | | | | |
| 1 | * | 0.40 | 0.20 | 0.40 | 0.575 | 0.275 | 0.150 | 1200 | 594 | 19.0 | 821 |
| 2 | A | 0.30 | 0.40 | 0.30 | 0.625 | 0.125 | 0.250 | 1230 | 693 | 29.7 | 401 |
| 3 | A | | | | 0.575 | 0.275 | 0.150 | 1230 | 725 | 25.1 | 509 |
| 4 | A | | | | 0.525 | 0.425 | 0.050 | 1230 | 743 | 25.2 | 412 |
| 5 | | 0.30 | 0.30 | 0.40 | 0.625 | 0.125 | 0.250 | 1210 | 515 | 26.8 | 428 |
| 6 | | | | | 0.575 | 0.275 | 0.150 | 1210 | 621 | 25.8 | 511 |
| 7 | | | | | 0.525 | 0.425 | 0.050 | 1210 | 747 | 25.2 | 350 |
| 8 | G | 0.30 | 0.20 | 0.50 | 0.625 | 0.125 | 0.250 | 1190 | 893 | 21.6 | 648 |
| 9 | G | | | | 0.575 | 0.275 | 0.150 | 1200 | 666 | 20.6 | 1516 |
| 10 | G | | | | 0.525 | 0.425 | 0.050 | 1190 | 678 | 20.5 | 529 |
| 11 | * | 0.30 | 0.10 | 0.60 | 0.625 | 0.125 | 0.250 | 1190 | 1191 | 17.6 | 254 |
| 12 | | 0.20 | 0.50 | 0.30 | 0.625 | 0.125 | 0.250 | 1240 | 636 | 34.7 | 1346 |
| 13 | | | | | 0.575 | 0.275 | 0.150 | 1230 | 650 | 25.3 | 1031 |
| 14 | | | | | 0.525 | 0.425 | 0.050 | 1240 | 609 | 24.3 | 761 |
| 15 | | 0.20 | 0.40 | 0.40 | 0.625 | 0.125 | 0.250 | 1240 | 520 | 38.9 | 563 |
| 16 | | | | | 0.575 | 0.275 | 0.150 | 1240 | 707 | 38.5 | 416 |
| 17 | | 0.20 | 0.40 | 0.40 | 0.625 | 0.125 | 0.250 | 1240 | 520 | 38.9 | 563 |
| 18 | | 0.20 | 0.30 | 0.50 | 0.625 | 0.125 | 0.250 | 1220 | 494 | 30.1 | 610 |
| 19 | | | | | 0.575 | 0.275 | 0.150 | 1230 | 589 | 33.2 | 1926 |
| 20 | | | | | 0.525 | 0.425 | 0.050 | 1230 | 684 | 37.4 | 871 |
| 21 | | 0.20 | 0.20 | 0.60 | 0.625 | 0.125 | 0.250 | 1220 | 450 | 26.4 | 3738 |
| 22 | | | | | 0.575 | 0.275 | 0.150 | 1230 | 515 | 24.3 | 2944 |
| 23 | | | | | 0.525 | 0.425 | 0.050 | 1220 | 546 | 30.4 | 1174 |
| 24 | F | 0.20 | 0.10 | 0.70 | 0.625 | 0.125 | 0.250 | 1220 | 443 | 20.9 | 2049 |
| 25 | F | | | | 0.575 | 0.275 | 0.150 | 1220 | 462 | 20.8 | 3082 |
| 26 | F | | | | 0.525 | 0.425 | 0.050 | 1220 | 525 | 22.2 | 1043 |
| 27 | * | 0.20 | 0.00 | 0.80 | 0.625 | 0.125 | 0.250 | 1220 | 589 | 17.5 | 280 |
| 28 | B | 0.10 | 0.60 | 0.30 | 0.625 | 0.125 | 0.250 | 1240 | 381 | 27.4 | 2517 |
| 29 | B | | | | 0.575 | 0.275 | 0.150 | 1230 | 394 | 21.1 | 2774 |
| 30 | B | | | | 0.525 | 0.425 | 0.050 | 1220 | 391 | 20.5 | 1068 |
| 31 | | 0.10 | 0.50 | 0.40 | 0.625 | 0.125 | 0.250 | 1240 | 751 | 44.4 | 1294 |
| 32 | | | | | 0.575 | 0.275 | 0.150 | 1240 | 760 | 37.9 | 1627 |
| 33 | | 0.10 | 0.50 | 0.40 | 0.525 | 0.425 | 0.050 | 1240 | 765 | 40.8 | 780 |
| 34 | | 0.10 | 0.40 | 0.50 | 0.625 | 0.125 | 0.250 | 1230 | 519 | 42.3 | 1447 |
| 35 | | | | | 0.575 | 0.275 | 0.150 | 1230 | 536 | 45.7 | 862 |
| 36 | | | | | 0.525 | 0.425 | 0.050 | 1230 | 695 | 46.3 | 293 |
| 37 | | 0.10 | 0.30 | 0.60 | 0.625 | 0.125 | 0.250 | 1220 | 355 | 36.3 | 2186 |
| 38 | | | | | 0.575 | 0.275 | 0.150 | 1230 | 380 | 36.0 | 1441 |
| 39 | | | | | 0.525 | 0.425 | 0.050 | 1220 | 401 | 35.8 | 754 |
| 40 | | 0.10 | 0.20 | 0.70 | 0.625 | 0.125 | 0.250 | 1220 | 316 | 25.8 | 2969 |
| 41 | | | | | 0.575 | 0.275 | 0.150 | 1220 | 332 | 24.9 | 1168 |
| 42 | | | | | 0.525 | 0.425 | 0.050 | 1220 | 341 | 28.9 | 870 |
| 43 | | 0.10 | 0.10 | 0.80 | 0.625 | 0.125 | 0.250 | 1220 | 246 | 20.9 | 4860 |
| 44 | | | | | 0.575 | 0.275 | 0.150 | 1220 | 257 | 20.7 | 1974 |
| 45 | | | | | 0.525 | 0.425 | 0.050 | 1220 | 274 | 21.0 | 1548 |
| 46 | E | 0.10 | 0.05 | 0.85 | 0.625 | 0.125 | 0.250 | 1220 | 2.3 | 20.1 | 3320 |
| 47 | E | | | | 0.575 | 0.275 | 0.150 | 1210 | 217 | 20.2 | 2139 |
| 48 | E | | | | 0.525 | 0.425 | 0.050 | 1210 | 238 | 20.2 | 1937 |

Table 1 — Continued

| Material number | Mol ratio of basic composition | | | Mol ratio of x component of composition | | | Firing tem. (°C) | Relative dielectric constant | Electromechanical coupling factor Kp % | Mechanical quality factor Qm |
|---|---|---|---|---|---|---|---|---|---|---|
| | x | y | z | α | 2 − 3α | 2α − 1 | | | | |
| 49 | 0.05 | 0.55 | 0.40 | 0.625 | 0.125 | 0.250 | 1240 | 517 | 33.2 | 1923 |
| 50 | | | | 0.575 | 0.275 | 0.150 | 1230 | 524 | 29.9 | 1167 |
| 51 | | | | 0.525 | 0.425 | 0.050 | 1240 | 530 | 24.8 | 347 |
| 52 | 0.05 | 0.40 | 0.55 | 0.625 | 0.125 | 0.250 | 1240 | 374 | 52.0 | 1041 |
| 53 | | | | 0.575 | 0.275 | 0.150 | 1220 | 476 | 44.8 | 648 |
| 54 | | | | 0.525 | 0.425 | 0.050 | 1230 | 471 | 48.3 | 318 |
| 55 C | 0.01 | 0.60 | 0.39 | 0.625 | 0.125 | 0.250 | 1230 | 396 | 28.4 | 1511 |
| 56 C | | | | 0.575 | 0.275 | 0.150 | 1230 | 399 | 20.4 | 743 |
| 57 C | | | | 0.525 | 0.425 | 0.050 | 1230 | 421 | 20.9 | 452 |
| 58 | 0.01 | 0.46 | 0.53 | 0.625 | 0.125 | 0.250 | 1240 | 570 | 60.7 | 604 |
| 59 | | | | 0.575 | 0.275 | 0.150 | 1240 | 601 | 60.2 | 363 |
| 60 | | | | 0.525 | 0.425 | 0.050 | 1240 | 638 | 65.8 | 431 |
| 61 D | 0.01 | 0.14 | 0.85 | 0.625 | 0.125 | 0.250 | 1220 | 206 | 22.8 | 1023 |
| 62 D | | | | 0.575 | 0.275 | 0.150 | 1220 | 235 | 24.1 | 1017 |
| 63 D | | | | 0.525 | 0.425 | 0.050 | 1220 | 264 | 27.6 | 1056 |

Table 2

| Material Number | Mol ratio of basic composition | | | | Firing temp. (°C) | $\epsilon_r$ | Kp(%) | Qm | Rate of deterioration of Kt with 200 heat cycle tests (%) | Rate of change of IF with 200 heat cycle tests (%) |
|---|---|---|---|---|---|---|---|---|---|---|
| | x | y | z | α | | | | | | |
| 65 * | 0.05 | 0.43 | 0.52 | 0.500 | 1230 | 573 | 51.3 | 238 | 35.0 | 1.74 |
| 66 * | 0.05 | 0.43 | 0.52 | 0.510 | 1230 | 582 | 53.2 | 264 | 10.5 | 0.931 |
| 67 | 0.05 | 0.43 | 0.52 | 0.525 | 1230 | 536 | 54.3 | 536 | 0.1 | 0.028 |
| 68 | 0.05 | 0.43 | 0.52 | 0.575 | 1230 | 437 | 58.6 | 739 | 1.4 | 0.089 |
| 69 | 0.05 | 0.43 | 0.52 | 0.625 | 1240 | 398 | 62.1 | 893 | 3.5 | 0.168 |
| 70 * | 0.05 | 0.43 | 0.52 | 0.660 | 1240 | 387 | 58.3 | 981 | 38.2 | 1.83 |
| 71 * | 0.05 | 0.43 | 0.52 | 0.667 | 1240 | 376 | 54.8 | 1162 | 55.0 | 2.99 |
| 58 | 0.01 | 0.46 | 0.53 | 0.625 | 1240 | 570 | 60.7 | 604 | 4.5 | 0.255 |
| 36 | 0.10 | 0.40 | 0.50 | 0.525 | 1230 | 695 | 46.3 | 293 | 3.9 | 0.239 |

Figure 1:
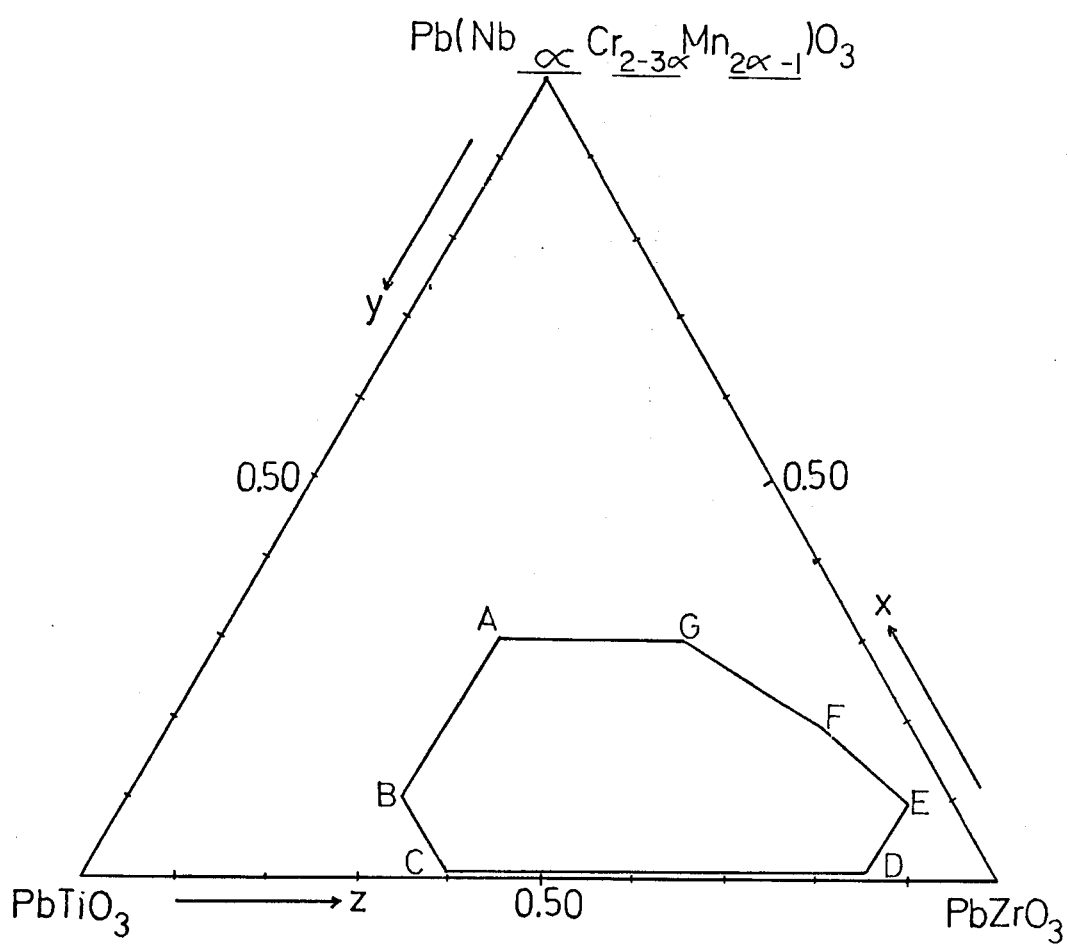
FIG. 1 is a triangular diagram showing the area of the ferroelectric ceramic compositions of this invention. The polygon encompassed by the points A, B, C, D, E, F and G in FIG. 1 indicates the area of the compositions of the invention.

In the Tables the asterisks (*) designate compositions beyond the limit of the area of the present invention, and the symbols A, B, C, D, E, F and G are equal to the same symbols in FIG. 1 of the drawings, respectively.

Figure 2:
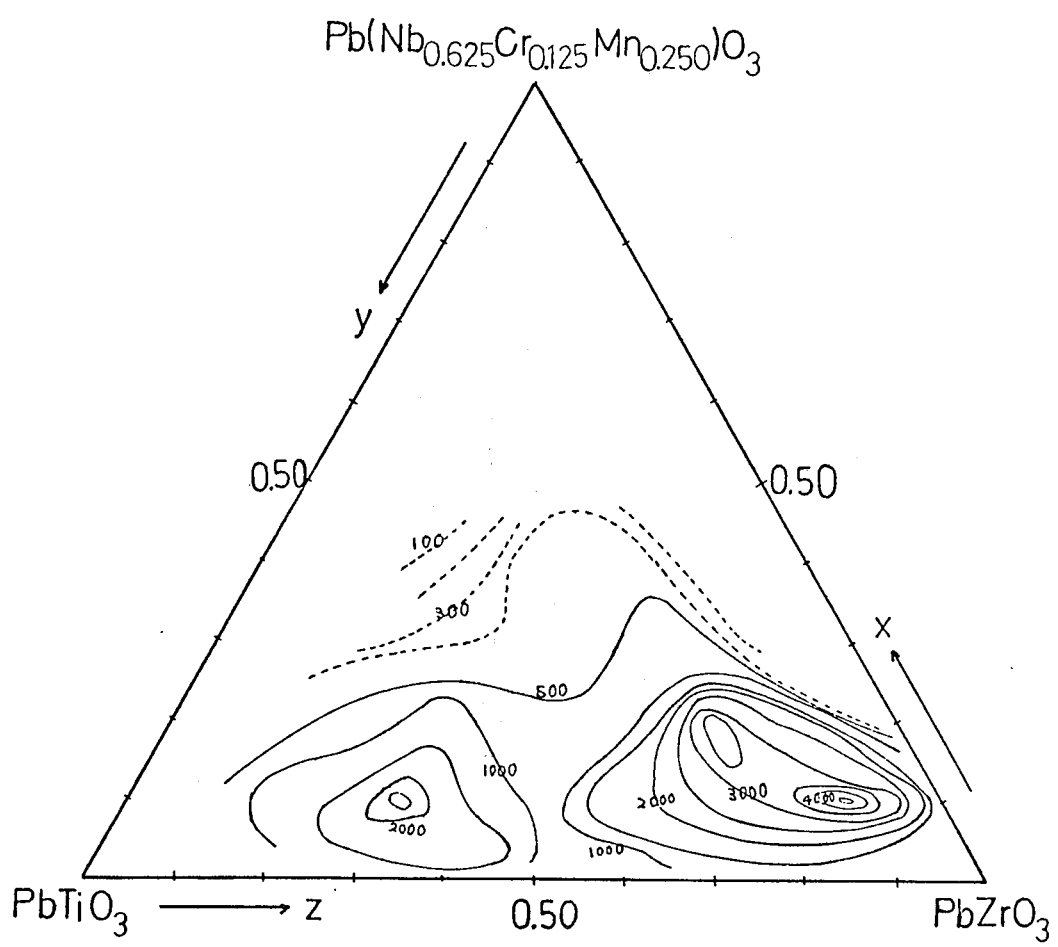
FIG. 2 is a triangular diagram showing the characteristic distribution of the mechanical quality factor ($Qm$), when $\alpha$ is 0.625 in said general formula.

FIG. 2 shows characteristic distribution curves of the mechanical quality factor (Qm), when α is 0.625 in said general formula. In FIG. 2 the curves shown as solid lines are drawn by plotting the points having the same value at intervals of 500 units and the curves shown as broken lines represent intervals of 100 units.

Figure 3:
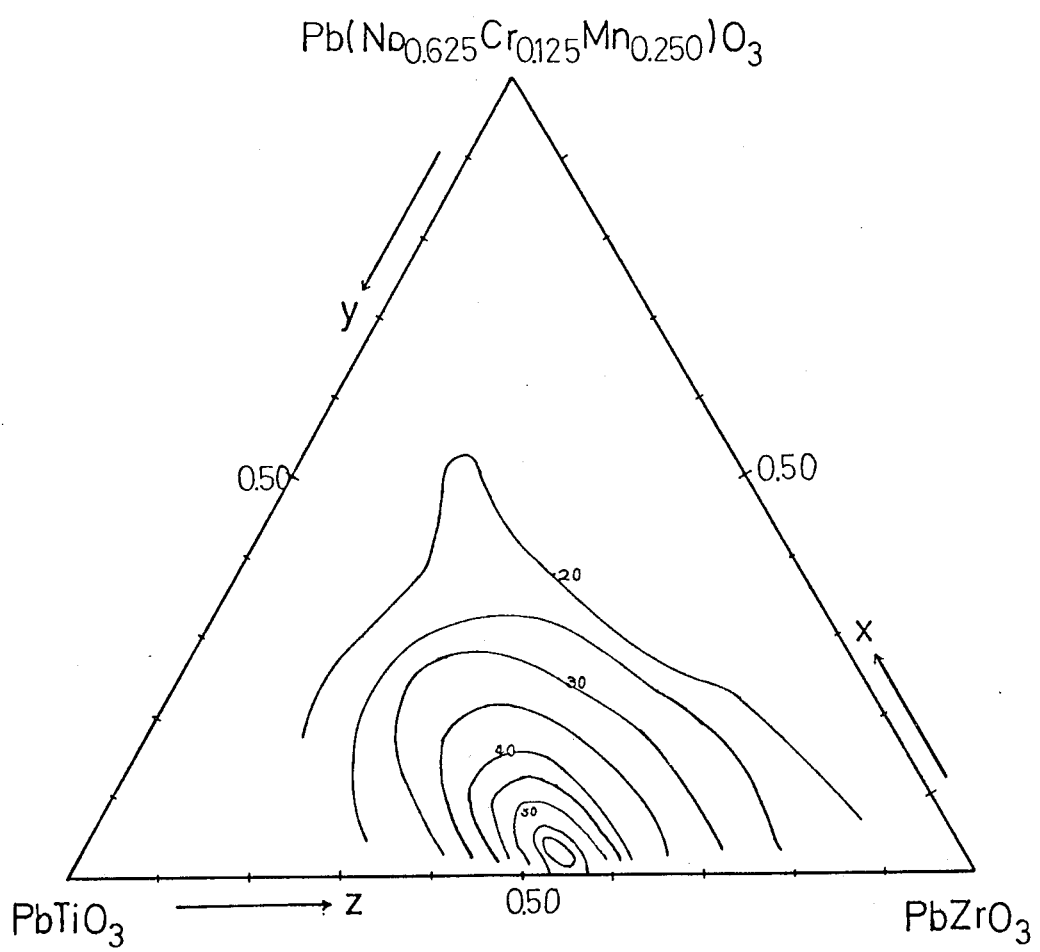
FIG. 3 is a triangular diagram showing the characteristic distribution of the electro-mechanical coupling factor ($Kp$), when $\alpha$ is 0.625 in said general formula.
Figure 4:
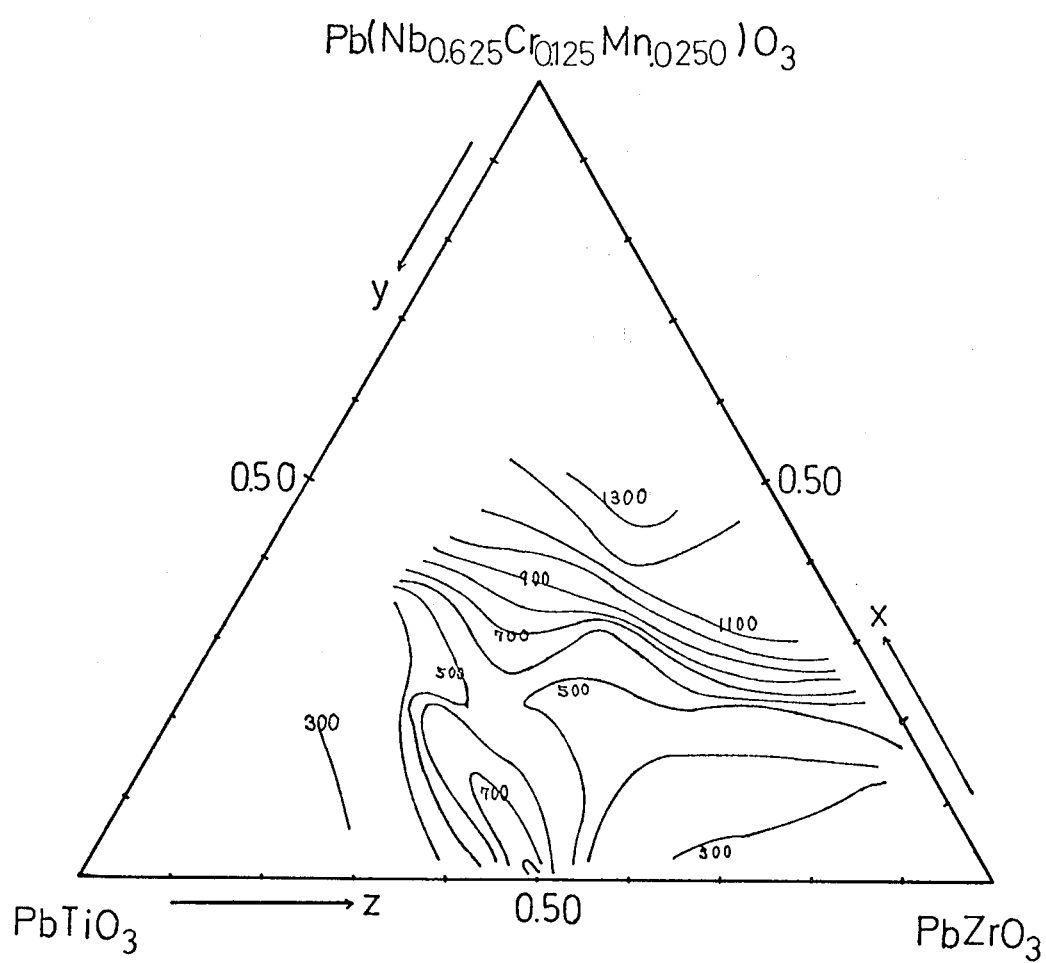
FIG. 4 is a triangular diagram showing the characteristic distribution of the relative dielectric constant ($\epsilon_{33}^T/\epsilon_o$), when $\alpha$ is 0.625 in said general formula.

FIG. 3 and FIG. 4 are characteristic distribution curves obtained in the same manner showing the electromechanical coupling factor (Kp) and the relative dielectric constant, respectively, when α is 0.625 in said general formula. In the former intervals shown are every 5 % and in the later figure the intervals shown are every 100 units.

The excellent characteristics of the composition of the invention are revealed clearly by the mechanical quality factor (Qm). For example, the Qm of composition Nos. 21 and 43 in Table 1 indicates a very high value of 3738 and 4860, respectively. In general, if piezoelectric ceramics are to be used as ceramic filters, they must have a large value of Qm. This requirement is met by the compositions of the present invention.

As shown in FIGS. 5 and 7, although the intermediate frequency of the thickness trap mode filters consisting of $Pb(Nb_{2/3}Mn_{1/3})O_3$-$PbTiO_3$-$PbZrO_3$ or $Pb(Nb_{1/2}Cr_{1/2})O_3$-$PbZrO_3$-$PbTiO_3$ varies greatly with only 30 to 40 heat cycle tests, the intermediate frequency of the thickness trap mode filters according to the invention is almost unchanged even after 200 heat cycle test. Further, as shown in FIG. 6 and 8, the electromechanical coupling factor (Kt) of the prior compositions mentioned above, which indicates the conversion efficiency between electric energy and mechanical energy of the piezoelectric materials, deteriorates about 20 % as compared with the primary value thereof after 100 heat cycle tests, but the electromechanical coupling factor (Kt) of the compositions according to the present invention is also unchanged even after 200 heat cycle tests. Thus the characteristics of the compositions according to the present invention are stable and constant with repeated high temperature and low temperature heat cycles.

The area of the present compositions has been described as being within the polygon encompassed by the points A, B, C, D, E, F and G in FIG. 1 for the reasons that (1) if the content of $PbZrO_3$ is less than 30 %, firing into the desired shape is difficult because of the value of α, and (2) the electromechanical coupling factor (Kp) of the compositions beyond the limit of the area of this invention has a value smaller than 20 %, which is poor from the point of view of utility.

Further, α in the general formula has been described as being within the range of 0.525 to 0.625 for the reason that if the value of α is beyond this range, the characteristics of the composition deteriorate gradually with repeated high temperature and low temperature heat cycles.

The invention being thus described, it will be obvious that the same may be varied in any ways. Such variations are not to be regarded as a departure from the spirit and scope of the invention, and all such modifications are intended to be included within the scope of the following claims.

What is claimed is:

1. Ferroelectric ceramic compositions comprising the ternary system ceramic composition which is represented by the general formula: $xPb(Nb_\alpha Cr_{2-3\alpha} Mn_{2-\alpha -1})O_3$-$yPbTiO_3$-$zPbZrO_3$ wherein x, y and z are the respective molecular ratios of each component $x + y + z = 1.00$ and $0.525 < \alpha < 0.625$, said compositions falling within the polygon encompassed by the points A, B, C, D, E, F and G in the attached FIG. 1, the sets of molecular ratios at the vertices of said polygon being as follows:

|   | x    | y    | z    |
|---|------|------|------|
| A | 0.30 | 0.40 | 0.30 |
| B | 0.10 | 0.60 | 0.30 |
| C | 0.01 | 0.60 | 0.39 |
| D | 0.01 | 0.14 | 0.85 |
| E | 0.10 | 0.05 | 0.85 |
| F | 0.20 | 0.10 | 0.70 |
| G | 0.30 | 0.20 | 0.50.|

2. Ferroelectric ceramic compositions comprising the ternary system ceramic composition which is represented by the general formula: $x\text{Pb}(\text{Nb}_{0.625}\text{Cr}_{0.125}\text{Mn}_{0.250})\text{O}_3\text{-}y\text{PbTiO}_3\text{-}z\text{PbZrO}_3$ wherein $x$, $y$ and $z$ are the respective molecular ratios of each component $x + y + z = 1.00$, said compositions falling within the polygon encompassed by the points A, B, C, D, E, F and G in the attached FIG. 1, wherein $\alpha$ in said figure is 0.625, the sets of molecular ratios at the vertices of said polygon being as follows:

|   | x    | y    | z    |
|---|------|------|------|
| A | 0.30 | 0.40 | 0.30 |
| B | 0.10 | 0.60 | 0.30 |
| C | 0.01 | 0.60 | 0.39 |
| D | 0.01 | 0.14 | 0.85 |
| E | 0.10 | 0.05 | 0.85 |
| F | 0.20 | 0.10 | 0.70 |
| G | 0.30 | 0.20 | 0.50.|

* * * * *

UNITED STATES PATENT OFFICE
CERTIFICATE OF CORRECTION

Patent No. 3,899,435　　　　　　　　Dated August 12, 1975

Inventor(s) Kiichi Minai, Isamu Inada, Kenji Ozawa & Kenji Okochi

It is certified that error appears in the above-identified patent and that said Letters Patent are hereby corrected as shown below:

In The Heading of the Patent, after "[21] Appl. No.: 323,297" please insert the following:

--Foreign Application Priority Data

Dec. 25, 1970　　Japan..................124950/1970

Aug. 30, 1971　　Japan................. 67177/1971--

Signed and Sealed this second Day of December 1975

[SEAL]

Attest:

RUTH C. MASON
*Attesting Officer*

C. MARSHALL DANN
*Commissioner of Patents and Trademarks*